US010100204B2

(12) United States Patent
Huang et al.

(10) Patent No.: US 10,100,204 B2
(45) Date of Patent: Oct. 16, 2018

(54) EXPANDABLE COATING COMPOSITIONS AND USE THEREOF

(71) Applicant: HENKEL IP & HOLDING GMBH, Duesseldorf (DE)

(72) Inventors: Tianjian Huang, Hillsborough, NJ (US); Kristina Thompson, Clinton, NJ (US); Daniel Waski, Elmhurst, IL (US); Kris Getty, Deerfield, IL (US)

(73) Assignee: HENKEL IP & HOLDING GMBH, Duesseldorf (DE)

( * ) Notice: Subject to any disclaimer, the term of this patent is extended or adjusted under 35 U.S.C. 154(b) by 0 days.

(21) Appl. No.: 15/410,920

(22) Filed: Jan. 20, 2017

(65) Prior Publication Data
US 2017/0130058 A1 May 11, 2017

Related U.S. Application Data

(63) Continuation of application No. PCT/US2015/041275, filed on Jul. 21, 2015.

(60) Provisional application No. 62/027,826, filed on Jul. 23, 2014.

(51) Int. Cl.
C09D 5/02 (2006.01)
C09D 201/00 (2006.01)
C09J 201/00 (2006.01)
B65D 65/42 (2006.01)
B65D 81/38 (2006.01)

(52) U.S. Cl.
CPC ............. *C09D 5/024* (2013.01); *B65D 65/42* (2013.01); *B65D 81/3888* (2013.01); *C09D 5/02* (2013.01); *C09D 201/00* (2013.01); *C09J 201/00* (2013.01)

(58) Field of Classification Search
CPC ...... C09D 5/024; C09D 201/00; C09J 201/00; B65D 81/3888; B65D 65/42
See application file for complete search history.

(56) References Cited

U.S. PATENT DOCUMENTS

| 2,998,501 | A | 8/1961 | Edberg et al. |
|---|---|---|---|
| 3,253,064 | A | 5/1966 | Buonaiuto |
| 3,401,475 | A | 9/1968 | Morehouse et al. |
| 3,563,851 | A | 2/1971 | Armour et al. |
| 3,615,972 | A | 10/1971 | Morehouse, Jr. et al. |
| 4,005,033 | A | 1/1977 | Georgeau |
| 4,006,273 | A | 2/1977 | Wolinski et al. |
| 4,094,685 | A | 6/1978 | Lester et al. |
| 4,350,788 | A | 9/1982 | Shimokawa et al. |
| 4,483,889 | A | 11/1984 | Andersson |
| 5,114,509 | A | 5/1992 | Johnston et al. |
| 5,264,467 | A | 11/1993 | DiStefano |
| 5,356,683 | A | 10/1994 | Egolf et al. |
| 5,387,626 | A | 2/1995 | Boehme-Kovac et al. |
| 5,393,336 | A | 2/1995 | Foran et al. |
| 5,542,599 | A | 8/1996 | Sobol |
| 5,685,480 | A | 11/1997 | Choi |
| 5,928,741 | A | 7/1999 | Andersen et al. |
| 6,139,961 | A | 10/2000 | Blankenship et al. |
| 6,231,970 | B1 | 5/2001 | Andersen et al. |
| 6,255,369 | B1 | 7/2001 | Philbin et al. |
| 6,379,497 | B1 | 4/2002 | Sandstrom et al. |
| 6,648,955 | B1 | 11/2003 | Swiezkowski et al. |
| 6,740,373 | B1 | 5/2004 | Swoboda et al. |
| 6,749,705 | B2 | 6/2004 | Skryniarz et al. |
| 6,838,187 | B2 | 1/2005 | Figiel et al. |
| 7,335,279 | B2 | 2/2008 | Monhan et al. |
| 9,273,230 | B2 | 3/2016 | Huang et al. |
| 2002/0068139 | A1 | 6/2002 | Polak et al. |
| 2002/0071947 | A1 | 6/2002 | Soane et al. |
| 2002/0094403 | A1 | 7/2002 | Ishikawa et al. |
| 2004/0033343 | A1 | 2/2004 | Comeau et al. |
| 2007/0009723 | A1 | 1/2007 | Ogawa et al. |
| 2007/0155859 | A1 | 7/2007 | Song et al. |
| 2007/0224395 | A1 | 9/2007 | Rowitsch et al. |
| 2007/0228134 | A1 | 10/2007 | Cook et al. |
| 2007/0287776 | A1 | 12/2007 | Nordin et al. |
| 2008/0118693 | A1 | 5/2008 | Bilski et al. |
| 2009/0280322 | A1 | 11/2009 | Daniels et al. |
| 2009/0321508 | A1 | 12/2009 | Fu et al. |
| 2010/0012712 | A1 | 1/2010 | Swoboda et al. |
| 2010/0136269 | A1 | 6/2010 | Andersen et al. |
| 2010/0139878 | A1 | 6/2010 | Nicolucci |

(Continued)

FOREIGN PATENT DOCUMENTS

| CA | 2078476 A1 | 3/1993 |
|---|---|---|
| CA | 2145938 A1 | 10/1995 |
| CN | 1643100 A | 7/2005 |
| CN | 101263184 A | 9/2008 |
| CN | 101476265 A | 7/2009 |
| EP | 1216146 B1 | 10/2005 |
| EP | 1634897 A2 | 3/2006 |
| EP | 1674543 A1 | 6/2006 |
| EP | 1780250 A1 | 5/2007 |
| JP | S6144965 A | 3/1986 |
| JP | H05239423 A | 9/1993 |
| JP | 6313163 A | 11/1994 |
| JP | H08175576 A | 7/1996 |

(Continued)

OTHER PUBLICATIONS

Popil, Roman E. et al. "Adhesive level effect on corrugated board strength—experiment and FE modeling." In: International progress in paper physics seminar. Oxford, Ohio: Miami University, 2006.

(Continued)

*Primary Examiner* — Michael C Miggins
(74) *Attorney, Agent, or Firm* — Sun Hee Lehmann

(57) ABSTRACT

The present invention is directed to impact resistant and/or thermally insulative coating compositions for protective packages. Particularly, the protective packages include envelopes, pillows and Gusseted bags that house fragile and/or perishable objects during transport or mailing. The coating composition, upon heat or radiation trigger, expands at least 2500% in volume. The protective packages coated with the coating composition provide impact resistance, high strength, thermal insulation and light-weighting.

21 Claims, No Drawings

(56) References Cited

U.S. PATENT DOCUMENTS

| | | |
|---|---|---|
| 2010/0181015 A1 | 7/2010 | Kohler |
| 2011/0019121 A1 | 1/2011 | Mo et al. |
| 2011/0033398 A1 | 2/2011 | Cauvin et al. |
| 2012/0015162 A1 | 1/2012 | Lion et al. |
| 2012/0048450 A1 | 3/2012 | Fu et al. |
| 2012/0100289 A1 | 4/2012 | Egan et al. |
| 2013/0160945 A1 | 6/2013 | Huang et al. |
| 2013/0303351 A1 | 11/2013 | Fu et al. |
| 2014/0131367 A1 | 5/2014 | Bordary et al. |

FOREIGN PATENT DOCUMENTS

| | | |
|---|---|---|
| JP | 9-164621 A | 6/1997 |
| JP | 09217050 A | 8/1997 |
| JP | 2001207146 A | 7/2001 |
| JP | 2003-154589 A | 5/2003 |
| JP | 2005097816 A | 4/2005 |
| JP | 2010202996 A | 9/2010 |
| WO | 9014223 A1 | 11/1990 |
| WO | 0162986 A1 | 8/2001 |
| WO | 0200800 A2 | 1/2002 |
| WO | 0231077 A2 | 4/2002 |
| WO | 2005110737 A1 | 11/2005 |
| WO | 2007091961 A1 | 8/2007 |
| WO | 2007135451 A1 | 11/2007 |
| WO | 2007142593 A1 | 12/2007 |
| WO | 2008084372 A1 | 7/2008 |

OTHER PUBLICATIONS

Bermesheva E.V.: "Zavisimost mezhdu vyazkouprugimi i adgezivnymi svoistvami polimernykh adgezivov: dopolnenie kriteriya liplosti Dalkkuista", 25 Sipozium Po Reologii, G.Ostashkov, Sep. 5, 2010 (Sep. 5, 2010), pp. 61-62.

EXPANDABLE COATING COMPOSITIONS AND USE THEREOF

FIELD OF THE INVENTION

The present invention relates to impact resistant and/or thermally insulative coating compositions for protective packages. The coating composition, upon heat or radiation trigger, expands at least 2500% in volume. Packages coated with the coating composition provide impact resistance, high strength, thermal insulation and light-weighting. Particularly, this invention relates to an envelope, pillow or package bag that will house a fragile and/or perishable object during transport or mailing as protective package.

BACKGROUND OF THE INVENTION

Traditional and widely used protective packaging materials include various padding or filler materials that are useful as impact and/or thermal insulations. For instance, package bag lined with plastic bubble wraps or foamed inserts, used alone or in conjunction with foam "peanuts" and bubble wraps are used for shipping fragile objects. Also, mailers with an outer pouch and an inner inflated liner are available; however, they are bulky in size or special machinery is required to force and seal the air in the liner as described in U.S. 2011/019121.

Because large portions of the traditional protective packaging materials are made out of plastic, they do not biodegrade and thus, have a negative impact on the environment.

The present invention seeks to improve protective packaging, through the use of a coating composition that provides impact resistance, high strength, and light-weighting to renewable and/or recyclable substrates. The present invention provides more environmentally and economically sound protective packages for shipping fragile and/or perishable objects. The present invention also seeks to minimize dependence on special machinery with readily available appliances, e.g., ovens and microwaves.

SUMMARY OF THE INVENTION

The present invention relates to coating compositions for protective packages that provide impact resistance, high strength, thermal insulation and light-weighting. The present invention further provides an article that comprises the coating composition applied onto a substrate. The coating composition, upon heat or radiation trigger, expands at least 2500% in volume. The article with the expanded volume can house a fragile and/or perishable object during transport or mailing with substantially less plastic materials.

In one embodiment, there is provided a coating composition comprising a water-based polymer prepared by emulsion polymerization; a plurality of expandable microspheres having a $T_0$ (onset of expansion) and $T_m$ (maximum expansion); and optionally an additive. The water-based polymer has a modulus less than 0.3 MPa and a tan δ greater than 0.35 at the mid-point of the expandable microspheres $T_0$ and $T_m$: $[T_0+(T_m-T_0)/2]$.

Another embodiment provides a process for forming a protective packaging article comprising the steps, (1) preparing a composition comprising a water-based polymer prepared by emulsion polymerization and a plurality of expandable microspheres having a $T_0$ and $T_m$; (2) applying the coating composition onto a substrate, which is a paper, paperboard, wood, or foil; (3) drying the coating composition to substantially remove the water; and (4) expanding the composition. The water-based polymer has a modulus less than 0.3 MPa and a tan δ at the mid-point of the expandable microspheres $T_0$ and $T_m$: $[T_0+(T_0-T_0)/2]$ is greater than 0.35. The drying temperature is less than $T_0$ and the expanding temperature is $T_0$ or greater.

Yet another embodiment is directed to a protective packaging article comprising a substrate and a coating composition comprising a water-based polymer prepared by emulsion polymerization; a plurality of expandable microspheres having a $T_0$ and $T_m$; and optionally an additive. The water-based polymer has a modulus less than 0.3 MPa and a tan δ greater than 0.35 at the mid-point of the expandable microspheres $T_0$ and $T_m$: $[T_0+(T_m-T_0)/2]$. The substrate is a paper, paperboard, wood, metallic paper, metallic paperboard or foil. In some embodiments, the substrates may be a recycled or recyclable plastic or plastic film.

DETAILED DESCRIPTION OF THE INVENTION

The present invention provides a coating composition that provides impact resistance, high strength, thermal insulation and light-weighting upon heating or applying radiation to the coating composition. The coating composition and the article made with the coating composition is more environmentally sound, e.g., reduces plastic waste.

The present invention is based on the discovery that a coating composition for protective packages comprising a water-based polymer, a plurality of expandable microspheres having a $T_0$ and $T_m$, and optionally an additive provide impact resistance, high strength, and light-weighting. The coating compositions described herein may be applied onto recyclable and renewable substrates of a protective package, and upon heating or applying radiation to the coating composition, the expandable microspheres expand. The protective packaging products useful herein include flexible envelope or pillow that will house a fragile and/or perishable object during transport or mailing without using bulky packaging materials.

The coating composition may be made from any number of materials. Desirably, the coating composition includes a water-based polymer prepared by emulsion polymerization; a plurality of expandable microspheres having a $T_0$ and $T_m$; and optionally a wax dispersion additive. The water-based polymer has a modulus less than 0.3 MPa at the mid-point of the expandable microspheres $T_0$ and $T_m$: $[T_0+(T_m-T_0)/2]$ and a tan δ at $[T_0+(T_m-T_0)/2]$ greater than 0.35. The coating composition may further include one or more preservatives, tackifiers, plasticizers, humectants or fillers. Other materials that do not adversely affect the coating composition and expansion properties of the coating composition may be used as desired.

The coating composition includes a water-based polymer prepared by emulsion polymerization. The emulsion polymer may be present in the coating composition in any amount, and desirably is present in an amount of from about 50% to about 99.5 wt %, preferably from about 50% to about 70 wt %, by weight of the coating composition prior to setting of the composition. Depending on the emulsion polymer, the solid levels vary from about 40 wt % to about 60 wt %, based on the emulsion polymer.

The water-based polymer may be selected so that it can be highly plasticized by water. This allows efficient expansion for the microspheres during heating. Preferably, the emulsion polymer is stabilized by hydrophilic protective colloids. The water-based polymer prepared by emulsion polymerization may be a single grade or a mixture of synthetic emulsion polymer or polymers of a natural origin. The water-based polymer prepared by emulsion polymerization may include any desired polymer components, including vinyl acetate ethylene dispersion, polyvinyl acetate, polyvinyl acetate polyvinyl alcohol, dextrin stabilized polyvinyl acetate, polyvinyl acetate copolymers, vinyl acetate ethylene copolymers, vinylacrylic, styrene acrylic, acrylic, styrene butyl rubber, polyurethane and mixtures thereof. Particularly preferred emulsion polymer components are vinyl acetate ethylene dispersion, vinylacrylic, styrene acrylic, acrylic, and polyvinyl acetate.

In one embodiment, the water-based polymer has an elastic modulus less than 0.3 MPa at the mid-point of the expandable microspheres $T_0$ and $T_m$: $[T_0+(T_m-T_0)/2]$. All reported modulus measurements, unless otherwise stated, were conducted in accordance with ASTM D5026. In another embodiment, the water-based polymer has a tan δ greater than 0.35 at the mid-point of the expandable microspheres $T_0$ and $T_m$: $[T_0+(T_m-T_0)/2]$ of the expandable microspheres.

The coating composition further includes a plurality of pre-expanded or expandable microspheres having a polymeric shell and a hydrocarbon core. The pre-expanded microspheres are fully expanded and do not need to undergo further expansion. The expandable microspheres useful in the present invention should be capable of expanding in size in the presence of heat and/or radiation energy (including, for example, microwave, infrared, radiofrequency, and/or ultrasonic energy). The microspheres useful in the present invention include, for example, heat expandable polymeric microspheres, including those having a hydrocarbon core and a polyacrylonitrile shell (such as those sold under the trade name DUALITE®) and other similar microspheres (such as those sold under the trade name EXPANCEL®). The expandable microspheres may have any unexpanded size, including from about 12 microns to about 30 microns in diameter. In the presence of heat, the expandable microspheres of the present invention may be capable of increasing in diameter by about 3 times to about 10 times. Upon expansion of the microspheres in the coating composition, the coating composition becomes a foam-like material, which has improved impact resistance and insulation properties. It may be desired, as will be explained below, that the expansion of the microspheres takes place in a partially set coating composition.

The expandable microspheres have a particular temperature at which they begin to expand ($T_0$) and a second temperature at which they have reached maximum expansion ($T_m$). Different grades of microspheres have different onset expansion temperature and maximum expansion temperature. For example, one particularly useful microsphere has a $T_0$ of about 80° C. to about 100° C. While any particular grade of microspheres may be used in the present invention, the $T_0$ and $T_m$ of the microspheres should be taken into account when formulating and processing. The temperature at which the microspheres have reached maximum expansion (T) is desirably from about 120° C. to about 130° C.

Although the choice of the particular microspheres and their respective $T_0$ and $T_m$ is not critical to the invention, the processing temperatures may be modified depending upon these temperatures. Before the coating composition is fully dried, these microspheres are able to move within the composition and are able to expand. Once the coating composition is fully dry, however, the microspheres are substantially locked in place, making expansion thereof difficult, if not impossible.

In preferred embodiments, it is desirable that the expandable microspheres be present in the coating composition in an amount of from about 10% to about 40% by weight of the coating composition prior to setting of the composition, and more desirably from about 15% to about 30% by weight of the adhesive coating composition prior to setting of the composition. The expansion ratio of the expandable microspheres and the loading level of the microspheres will be related to each other.

Depending on the fully expanded size of the microspheres, the amount of the expandable microspheres in the coating composition can be adjusted. Depending upon the particular expandable microspheres used in the composition, the desired amount of the microspheres in the composition may be modified. Typically, if the coating composition includes too high a concentration of expandable microspheres, there will be insufficient adhesion and strength upon expansion of the microspheres, thereby weakening the structural integrity of the composition.

It has been discovered that the addition of 10% to about 40% of expandable microspheres by weight of the coating composition prior to setting allows for improved structural integrity. The expanded coating has a greater than 2000%, preferably greater than 2500%, total volume expansion from a wet or partially-dry coating. Typically, polymers with low glass transition temperature (Tg) and high modulus at the expansion temperatures of the microsphere are selected as the basis binder for the coating compositions. Applicants have discovered that selecting binder polymers that have a modulus less than 0.3 MPa and a tan δ greater than 0.35 at the microsphere expansion temperatures results in higher expansion ratios of the coating.

The coating composition optionally includes a wax dispersion additive. Non-limiting wax dispersion additives include paraffin wax, beeswax, synthetic polyethylene wax, and the like. The melting point of the wax dispersion additive is desirably less than $T_0$ of the expandable microspheres. In one embodiment, the wax dispersion additive has a melting point less than 100° C.

Other additives include tackifiers, plasticizers, and preservative, e.g., biocide. Exemplary preservatives include 1,2-benzisothiazolin-3-one, 5-chloro-2-methyl-4-isothiazolin-3-one and 2-Methyl-4-isothiazolin-3-one. Typically, preservatives may be used in the amount of from about 0.05% to about 0.5% by weight of the coating composition prior to setting of the composition.

The adhesive composition may optionally include any polar solvent, particularly water, in the formulation.

The coating composition optionally further includes any defoamer, humectants, surfactant, colorant, crosslinkers, preservatives, filler, pigment, dye, stabilizer, rheology modifier, polyvinyl alcohol, and mixtures thereof. These components can be included in an amount of from about 0.05% to about 15% by weight of the coating composition prior to setting of the composition.

The addition of a crosslinker will further increase the structural integrity of the coating after the microspheres are expanded.

Although the coating composition can start to coalesce at room temperature, the coating composition may still have high moisture content and will be substantially fluid. A form of energy may be introduced to the coating composition to expand the microspheres before fully drying the coating. The form of energy is typically heat from conduction, induction or radiation. For a coating containing pre-expanded microspheres, no additional form of energy is necessary.

For both expandable and pre-expanded microsphere containing coatings, heaters and fans may be used to drive off the excess water to aid in drying the coatings. In a particularly desirable embodiment of manufacturing a protective article, the coating composition may be applied to the surface (or surfaces) of a substrate and subjected to heat sufficient to coalesce the coating. At the onset of coating coalescence and while the coating is still substantially fluid-like, the coating may aid in holding the microspheres in place, but will allow the microspheres the freedom to expand. In one embodiment, the heat may then be raised to a temperature sufficient to expand the microspheres. It is preferable for the heater to be set to a temperature range between the $T_0$ and $T_m$ of the microspheres. Finally, the heat may be raised again to a temperature sufficient to fully drive the water off the coating composition. Heat may be applied by any desired method, including in an oven or through the use of heated rollers. It should be noted that the various stages (onset of setting, expansion of the microspheres, and fully drying the coating) may be achieved by radiation energy, either as a replacement for, or in addition to, direct heat. That is, for example, the various steps may be achieved by use of microwave or radiofrequency radiation. Conduction, convection, and/or induction heating method may be used in the process as the heat source. Additionally, forced air is used in conjunction with the heat. In addition, the process may include any combination of heat application and radiation application. For example, the initial coalescence of the coating may be achieved through direct heat, while the expansion of the microspheres may be achieved through application of radiation energy.

Other additives may be included in the composition to increase the coalescence of the coating, if desired.

The inventive coating composition is particularly suitable for protective packages that will house a fragile and/or perishable object during transport or mailing. Exemplary protective packages include envelope, pillow, Gusseted bag and the like. The coated protective packages provide impact resistance, high strength, thermal insulation and light-weighting.

Another embodiment provides a method of preparing a protective package article, including the steps of: (1) preparing a composition comprising a water-based polymer prepared by emulsion polymerization and a plurality of expandable microspheres having a $T_0$ and $T_m$; (2) applying the coating composition onto a substrate, which is a paper, paperboard, wood, metallic paper, metallic paperboard, foil or plastic film; (3) drying the coating composition to substantially remove the water; and (4) expanding microspheres in the composition.

In another embodiment, a method of preparing a multi-substrate protective package article includes the steps of: (1) preparing a composition comprising a water-based polymer prepared by emulsion polymerization and a plurality of expandable microspheres having a $T_0$ and $T_m$; (2) applying the coating composition onto a portion of a first substrate; (2b) optionally, drying the coating composition to substantially remove the water; (3) applying an adhesive composition onto a different portion of the first substrate; (3b) optionally, drying the coating composition to substantially remove the water; (4) bringing a second substrate onto the first substrate, whereby the adhesive and the coating compositions are interposed in between the two substrates; and (5) expanding microspheres in the composition. The substrates are independently selected from a paper, paperboard, wood, metallic paper, metallic paperboard, foil or plastic film. Depending on the desired process and the coating composition, steps (2b) or (3b) can optionally be added to the method to efficiently remove the water. In some embodiment, the coating composition and the adhesive composition, steps (2) and (3), may be applied simultaneously. It is preferable the coating composition and adhesive composition are applied to different areas of the substrate. Moreover, to enhance impact resistance and thermal insulation, the adhesive includes microspheres. In another embodiment, the adhesive may be applied to a second substrate, or both substrates. Yet in a further embodiment, the coating composition may be applied to both a first and a second substrate to increase impact resistance and thermal insulation. It is further envisioned that multilayer, greater than two substrates may be used to prepare a multi-substrate protective package article to further increase impact resistance and thermal insulation.

The expansion of the microspheres may be performed with heat from conduction, convection or induction. Additionally, forced air is used in conjunction with the heat. The water-based polymer has a modulus less than 0.3 MPa and a tan δ value greater than 0.35 at $(T_m-T_0)/2$ of the microspheres. The drying temperature of the water-based polymer binder is less than $T_0$ and the expanding temperature is $T_0$ or greater. The expanded microspheres in the coating provide impact resistance, high strength, thermal insulation and light-weighting for the protective package.

The substrates include fibreboards, chipboards, corrugated boards, corrugated mediums, solid bleached boards (SBB), solid bleached sulphite boards (SBS), solid unbleached board (SLB), white lined chipboards (WLC), kraft papers, kraft boards, coated papers, binder boards, reduced basis weight substrates, metallic papers, metallic paperboards, foils, plastics or plastic films.

The microspheres on the protective package may be expanded immediately prior to use or pre-made in advance and stored until needed. Before expansion, the protective packages are in a thin-state and remain in a collapsed state and occupy less space. Upon introduction of energy, e.g., heat from conduction, convection, induction or radiation, the microspheres in the coating expand on the protective package. Equipment that forces air into the cavity of the protective package is unnecessary with the inventive coating composition.

In another embodiment, there is provided a protective package with multi-substrate layers. The package includes an inner substrate and an outer substrate of the package. The package further includes a coating applied onto either one or both layers of the package, where the coating composition comprises a plurality of expandable microspheres secured thereto, where the plurality of expandable microspheres has been expanded and the coating composition has been dried. Thus, the protective package includes an article having an adhered, foam-like composition on one or both sides thereof.

The coating composition may be applied onto the surface of the substrate in any configuration desired, including in a series of dots, stripes, waves, checkerboard patterns, any general polyhedron shapes, and combinations thereof. In addition, if desired, the coating composition may be applied to the entire surface of the substrate of the package. In certain embodiments, the outer edges of the substrates are not coated with the coating composition and are reserved for an adhesive. The substrates are then adhered together at the edges to form the multi-substrate layers, which can form the protective package, e.g., envelope, pillow, Gusseted bags, and the like.

The coating composition may be applied in the presence of heat if desired; however, it is important that the heat at application not be so high as to fully set the coating composition before expanding the expandable microspheres.

The inventive adhesive is particularly suitable for consumer packages that require protection and insulation during mailing and transportation.

The present invention may be better understood through analysis of the following examples, which are non-limiting and are intended only to help explain the invention.

EXAMPLES

Example 1

Water-Based Polymer Binder

Water-based polymer with the following modulus and tan δ values measured at the mid-point of the expandable microspheres $T_0$ and $T_m$: $[T_0+(T_m-T_0)/2]$ of expandable microspheres DUALITE® U020-130D microsphere are shown in Table 1.

TABLE 1

| Binder | Modulus at $[T_0 + (T_m - T_0)/2]$ (Pa) | Tanδ at $[T_0 + (T_m - T_0)/2]$ |
|---|---|---|
| A | $0.16 \times 10^6$ | 0.43 |
| B | $<0.084 \times 10^6$ | 0.61 |
| Comparative X | $0.37 \times 10^6$ | 0.34 |

Example 2

Coating Compositions

Coating compositions were prepared having the following components.

TABLE 2

| Component | Sample 1 (wt %) | Sample 2 (wt %) | Sample 3 (wt %) | Comparative Sample A (wt %) |
|---|---|---|---|---|
| Water-based resin emulsion A | 61.65 | 30.00 | 61.65 | — |
| Water-based resin emulsion B | — | 31.65 | — | — |
| Comparative Water-based resin emulsion X | — | — | — | 61.65 |
| Expandable microspheres DUALITE ® U020-130D | 20.8 | 20.8 | 20.8 | 20.8 |
| Wax additive | 7.80 | 7.80 | 0 | 7.80 |
| water | 9.75 | 9.75 | 17.55 | 9.75 |

Example 3

Expansion Ratios

The coating composition was applied onto a paper substrate and heated for 25 seconds at 265° F., 275° F. or 285° F. The volume percent increases are shown in Table 3.

TABLE 3

| | Expansion Ratios (V/V %) | | | |
|---|---|---|---|---|
| T/time | Sample 1 | Sample 2 | Sample 3 | Comparative Sample |
| 265° F./25 sec | 2950% | 3500% | 2550% | 1800% |
| 275° F./25 sec | 4050% | 4600% | 2850% | 2100% |
| 285° F./25 sec | 5250% | 6650% | 3000% | 2500% |

As shown in Table 3, Samples 1, 2 and 3 had higher expansion ratios than the Comparative Sample at all temperatures. Thus, coatings formed with binders having a modulus less than 0.3 MPa and tan δ greater than 0.35 at the mid-point of the expandable microspheres $T_0$ and $T_m$: $[T_0+(T_m-T_0)/2]$ of the microspheres allowed the microspheres to expand more at each of the tested temperatures.

The addition of a wax dispersion additive also increased the expansion ratios. Samples 1 and 2 that contain wax additive also had higher expansion ratios than coating without the wax additive, Sample 3.

The invention claimed is:

1. A coating composition comprising:
   (a) a water-based polymer prepared by emulsion polymerization;
   (b) a plurality of expandable microspheres having a $T_0$ (onset of expansion) and $T_m$ (maximum expansion); and
   (c) optionally, an additive;
   wherein the polymer has a modulus of about 0.16 to less than 0.3 MPa and a tan δ greater than 0.35 at the mid-point of the expandable microspheres $T_0$ and $T_m$, $[T_0+(T_m-T_0)/2]$.

2. The coating of claim 1, wherein the polymer has a modulus less than 0.2 MPa and the tan δ is greater than 0.4.

3. The coating of claim 1, wherein the water-based polymer is selected from the group consisting of vinyl acetate ethylene dispersion, polyvinyl acetate, polyvinyl acetate polyvinyl alcohol, dextrin stabilized polyvinyl acetate, polyvinyl acetate copolymers, vinyl acetate ethylene copolymers, vinyl acrylic, styrene acrylic, acrylic, styrene butyl rubber, polyurethane and mixtures thereof.

4. The coating of claim 1, wherein the expandable microspheres have a polymeric shell and a hydrocarbon core.

5. The coating of claim 1, further comprising a defoamer, humectants, surfactant, colorant, crosslinkers, preservatives, filler, pigment, dye, stabilizer, rheology modifier, polyvinyl alcohol, and mixtures thereof.

6. The coating of claim 1, wherein the coating comprises less than or equal to 30 dry weight percent of the expandable microspheres.

7. The coating of claim 1, wherein the water-based polymer has an absolute slope, which is log (elastic modulus) verses temperature, of greater than 0.014.

8. The coating of claim 7, wherein the water-based polymer has an absolute slope, which is log (elastic modulus) verses temperature, of greater than 0.025.

9. The coating of claim 1, wherein the expandable microspheres have a $T_0$ of less than 80° C.

10. The coating of claim 9, wherein the expandable microspheres have a $T_0$ of less than 90° C.

11. The coating of claim 1, wherein the expandable microspheres have a $T_m$ of greater than 150° C.

12. The coating of claim 11, wherein the expandable microspheres have a $T_m$ of greater than 130° C.

13. The coating of claim 1, wherein the additive is selected from the group consisting of tackifiers, plasticizers, wax dispersion additive, preservative, and mixtures thereof.

14. The coating of claim 13, wherein the wax dispersion additive has a melting point less than 100° C.

15. The coating of claim 14, wherein the wax dispersion additive is selected from the group consisting of paraffin, beeswax, synthetic polyethylene wax, and mixtures thereof.

16. An article comprising a substrate and a composition comprising the adhesive of claim 1.

17. The article of claim 16 which is a shipping or mailing protective package.

18. A process for forming an article comprising the steps of:
   (a) preparing a coating composition comprising (i) a water-based polymer prepared by emulsion polymerization selected from the group consisting of vinyl acetate ethylene dispersion, polyvinyl acetate, polyvinyl acetate polyvinyl alcohol, dextrin stabilized polyvinyl acetate, polyvinyl acetate copolymers, vinyl acetate ethylene copolymers, styrene butyl rubber, polyurethane and mixtures thereof and (ii) a plurality of expandable microspheres having a $T_0$ and $T_m$; wherein the polymer has a modulus less than 0.3 MPa and a tan δ greater than 0.35 at $[T_0+(T_m-T_0)/2]$;
   (b) applying the coating onto a substrate, which is a paper, paperboard, wood, foil, plastic or plastic film;
   (c) drying the coating to substantially remove the water, wherein the drying temperature is less than $T_0$; and
   (d) expanding the composition at a temperature of $T_0$ or greater.

19. A process for forming an article comprising the steps of:
   (a) preparing a coating composition comprising (i) a water-based polymer prepared by emulsion polymerization selected from the group consisting of vinyl acetate ethylene dispersion, polyvinyl acetate, polyvinyl acetate polyvinyl alcohol, dextrin stabilized polyvinyl acetate, polyvinyl acetate copolymers, vinyl acetate ethylene copolymers, styrene butyl rubber, polyurethane and mixtures thereof and (ii) a plurality of expandable microspheres having a $T_0$ and $T_m$; wherein the polymer has a modulus less than 0.3 MPa and a tan δ greater than 0.35 at the mid-point of the expandable microspheres $T_0$ and $T_m$, $[T_0+(T_m-T_0)/2]$;
   (b) applying the coating onto a substrate, which is a paper, paperboard, wood, foil, plastic or plastic film;
      (b1) optionally, drying the coating to substantially remove the water, wherein the drying temperature is less than $T_0$;
   (c) applying an adhesive composition onto a different portion of the first substrate;
   (d) optionally, drying the coating to substantially remove the water, wherein the drying temperature is less than $T_0$;
   (e) expanding the composition at a temperature of To or greater.

20. The process of claim 19, wherein steps (b) and (c) are conducted as a single step.

21. A coating composition comprising:
   (a) a water-based polymer prepared by emulsion polymerization selected from the group consisting of vinyl acetate ethylene dispersion, polyvinyl acetate, polyvinyl acetate polyvinyl alcohol, dextrin stabilized polyvinyl acetate, polyvinyl acetate copolymers, vinyl acetate ethylene copolymers, styrene butyl rubber, polyurethane and mixtures thereof;
   (b) a plurality of expandable microspheres having a $T_0$ (onset of expansion) and $T_m$ (maximum expansion); and
   (c) optionally, an additive;
   wherein the polymer has a modulus of less than 0.3 MPa and a tan δ greater than 0.35 at the mid-point of the expandable microspheres $T_0$ and $T_m$, $[T_0+(T_m-T_0)/2]$.

* * * * *

UNITED STATES PATENT AND TRADEMARK OFFICE
CERTIFICATE OF CORRECTION

PATENT NO. : 10,100,204 B2
APPLICATION NO. : 15/410920
DATED : October 16, 2018
INVENTOR(S) : Tianjian Huang et al.

Page 1 of 1

It is certified that error appears in the above-identified patent and that said Letters Patent is hereby corrected as shown below:

In the Specification

Column 2 Line 3: Change "$T_m$: $[T_o +(T_o -T_o)/2]$" to "$T_m$: $[T_o +(T_m -T_o)/2]$"

Signed and Sealed this
Sixth Day of August, 2019

Andrei Iancu
*Director of the United States Patent and Trademark Office*